United States Patent

[11] 3,627,139

[72] Inventor  Nikolai Alexandrovich Burtsev
               ulitsa Dagestans Kaya 20, kv. 12,
               Sverdlovsk, U.S.S.R.
[21] Appl. No. 48,106
[22] Filed     June 22, 1970
[45] Patented  Dec. 14, 1971

[54] CONTINUOUS DRUM VACUUM FILTER
     2 Claims, 6 Drawing Figs.
[52] U.S. Cl. .................................... 210/393,
                                                 210/404
[51] Int. Cl. ..................................... B01d 35/22
[50] Field of Search .......................... 210/402,
             404, 406, 408, 409, 410, 411, 416, 393

[56]              References Cited
            UNITED STATES PATENTS
3,363,774  1/1968  Luthi ........................ 210/404

Primary Examiner—Reuben Friedman
Assistant Examiner—T. A. Granger
Attorney—Waters, Roditi, Schwartz & Nissen ABSTRACT: A continuous drum vacuum filter wherein the drum, rotatable about its axis, has on its working surface cells whose external sides are formed by a filtering material. The cells are connected by means of ducts to the movable part of a valve installed coaxially with the drum and serving to connect the cells in the required sequence to suction and compressed air lines during rotation of the drum. The fixed part of the valve has an overflow channel so ensuring communication of a cell emerging from the suspension with a cell submerging into the suspension that overflowing of the filtrate from the former cell to the latter is ensured.

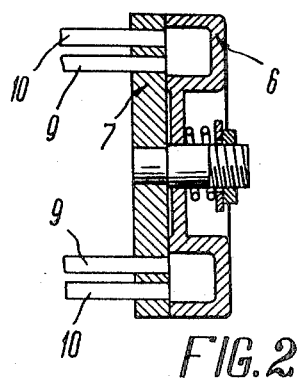
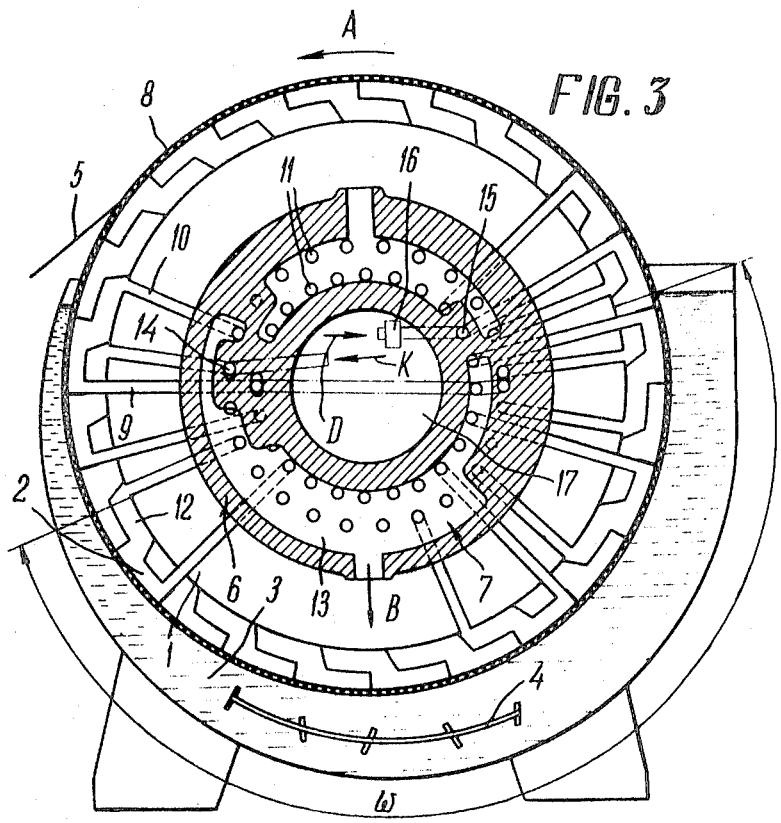

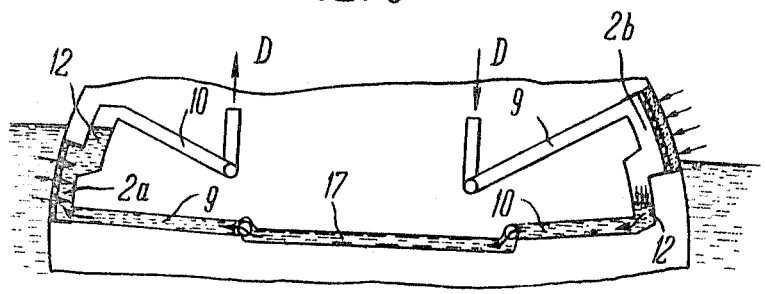
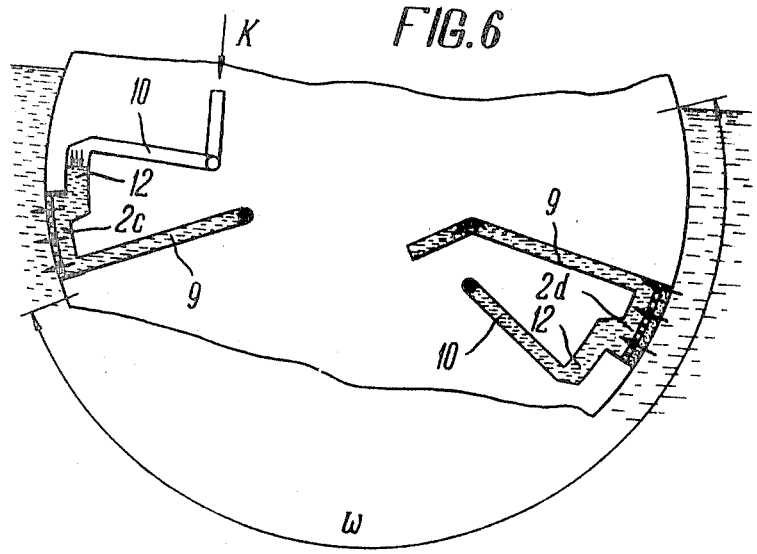

CONTINUOUS DRUM VACUUM FILTER

The present invention relates to apparatuses for separating suspensions into the liquid and solid phases and, more particularly, to continuous drum vacuum filters used in the chemical, food, ore-concentration, medicine and other industries.

Known in the prior art are continuous drum vacuum filters comprising a drum rotatable about its own axis, whose working cylindrical surface is formed by a filtering material, for example, filter fabric, and is divided along the circumference into a plurality of cells; a trough with a suspension into which the drum is partly submerged; a device for removing the precipitate from the external surface of the filtering material; a valve consisting of a movable and a fixed parts whose ends are lapped and pressed against each other. The movable part of the valve is secured on the end part of the drum and revolves together with it. It has orifices, each of which is connected by means of ducts to the corresponding cell of the drum. The fixed part of the valve is an annular box divided into a number of separate chambers, some of which communicate with a vacuum and others with a source of compressed air. The chambers communicating with the vacuum form zones of filtration, washing and drying of the precipitate on the drum. The chambers communicating with the source of compressed air are zones for separating the precipitate from the filtering material and regeneration of the filtering material.

Upon rotation of the drum each of its cells alternatively communicates with all the said valve chambers.

The valve chambers are so arranged that each cell upon being submerged into the suspension communicates with the compressed air line. The compressed air flows into the cell and, upon passing through the filtering material, regenerates it. Then each cell communicates with the vacuum, and at the expense of the rarefaction in the cell the filtrate is sucked from the trough into the cell through the filtering material. The filtrate is sucked into the cell before the latter moves out of the suspension.

A disadvantage of these known vacuum filters, however, consists in that the regeneration of the filtering material in them is performed by means of compressed air, which does not ensure sufficiently complete regeneration of the filtering material. This is explained by the fact that the compressed air does not blow through the fine capillaries, but passes only through the course capillaries of the filtering material, without removing from the capillaries separate particles of the solid phase retained by the forces of surface tension. As a result the capillaries are rapidly clogged, and the rate of filtration sharply decreases. The result is that the mean output of these vacuum filters is considerably lower than the initial one. An increase of the zone of regeneration of the filtering material does not improve regeneration, but, on the contrary, leads to the additional clogging of the capillaries of the filtering material by the minutest bubbles of air, as a result of which the resistance to filtration grows and additional conditions are created for clogging of the filtering material with solid particles. This shortcoming, besides reducing the output of the filter, leads to an increase in the consumption of the filtering material.

There are also known continuous drum vacuum filters whose design is similar to that of the filters described above, wherein regeneration of the filtering material is performed by the filtrate, i.e., by the liquid filtered in the course of operation of the filter. The fixed part of the valve of these filters has such an arrangement of the chambers which ensures communication of a cell with the vacuum at the beginning of its submergence into the suspension. The cell is filled with the filtrate in an amount sufficient for ensuring regeneration of the filtering material. At the moment when the cell is in its lowest position, and its filtering surface is almost horizontal and is completely covered by the filtrate, compressed air is fed into the cell through the valve. This air forces out the filtrate from the cell through the filtering material into the trough and thus regenerates the material; after this the cell is again brought into communication with the vacuum, and filtration proper takes place.

Owing to the use of liquid regeneration of the filtering material, these vacuum filters do not have the shortcomings of the vacuum filters with air regeneration described above. The known vacuum filters with liquid regeneration, however, have a very small zone of filtration, equal to or less than half the angle of submergence of the drum into the suspension, regardless of its size. The other half of the angle of submergence is used for sucking the filtrate required for regeneration of the filtering material into the cell and carrying out regeneration in the way indicated above.

Owing to this shortcoming such filters can be employed only for the filtration of easily filtered suspensions, where a large zone of filtration is not required, and are mainly used for the filtration of sodium bicarbonate (soda).

A particular object of the present invention is to provide such a continuous drum vacuum filter with regeneration of the filtering material by the countercurrent of the liquid wherein the zone of filtration will be increased by reducing the zone of regeneration, which will make it possible to considerably expand the field of application of vacuum filters with liquid regeneration.

This object is achieved by designing a continuous drum vacuum filter comprising a drum rotatable about its own axis and having cells arranged on its working surface, the external sides of the cells being formed by filtering material, said cells being connected by means of ducts with a movable part of a valve installed coaxially with the drum and serving to connect the cells during rotation of the drum in the required sequence with suction and compressed air lines, a trough for a suspension in which the drum is partly submerged, and a device for removing the precipitate from the external surface of the filtering material, wherein a fixed part of the valve is provided, according to the present invention, with an overflow channel for connecting the cells emerging from the suspension with the cells submerging into the latter, this channel ensuring overflowing of the filtrate from the former cells to the latter ones. This results in rapid filling of a cell with the filtrate required for regeneration by the filtering material, owing to which the regeneration can be performed immediately after submersion of the cell into the suspension, and the zone of regeneration occupies an insignificant part of the angle of submergence of the drum in the suspension, while the zone of filtration is considerably extended.

In vacuum filters with a great angle of submergence of the drum in the suspension it is preferable to provide the cells with accumulating pockets for the suspension.

The nature of the present invention will become more fully apparent from a consideration of the following description of an exemplary embodiment thereof, taken in conjunction with the accompanying drawings, in which:

FIG. 2 is a sectional view of a valve according to the invention;

FIG. 3 is a deeply submerged drum vacuum filter according to the invention;

FIG. 5 is a diagram showing the operation of the drum vacuum filter of FIG. 2;

FIG. 6 is the same.

Figure 1:
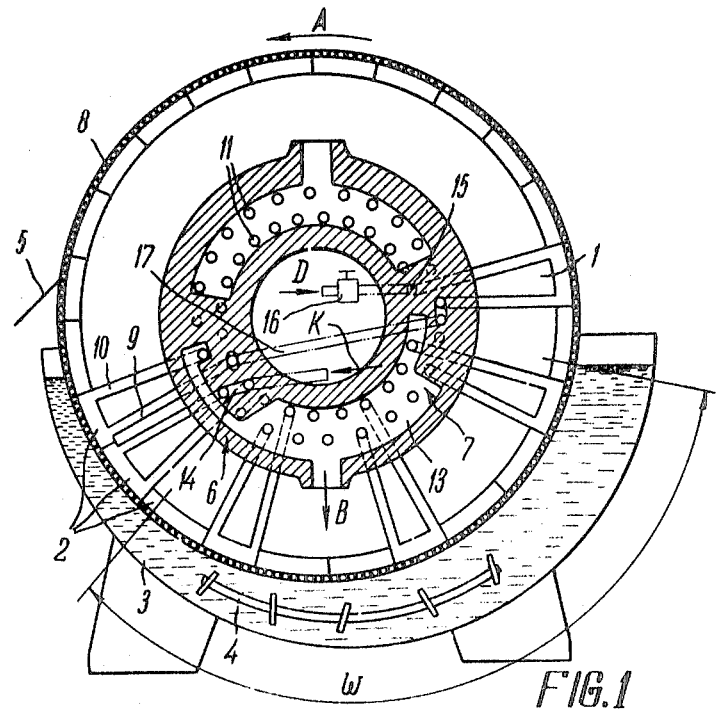
FIG. 1 is a schematic sectional view of a continuous drum vacuum filter according to the invention.

The continuous drum vacuum filter comprises drum 1 (FIG. 1) with a plurality of cells 2.

Drum 1 is provided with a drive (not shown) for ensuring rotation of drum 1 about its own axis. Drum 1 is partly submerged in trough 3 containing the suspension which is to be filtered. Mixer 4 is installed in trough 3. The vacuum filter is also provided with device 5 for removing the precipitated and with a valve installed coaxially with drum 1 and having fixed part 6 and movable part 7 (FIGS. 1 and 2) whose ends are lapped and pressed against each other. Movable part 7 of the valve is secured on the end part of drum 1 (FIG. 1) and rotates together with it.

On its external cylindrical surface the drum is provided with drainage grate 8 (FIG. 1) which is covered with a filtering medium, for example, filter fabric or some other filtering material.

Each cell 2 is provided with two ducts 9 and 10. Duct 9 passes at the front wall of cell 2 in the direction of rotation of drum 1 (the direction of rotation of drum 1 is shown in FIG. 1 by arrow A), and duct 10 at the rear wall of cell 2. In the longitudinal direction of drum 1 each cell 2 may have several ducts 9 and several ducts 10. The ends of ducts 9 and 10 are connected to movable part 7 of the valve, the ends of ducts 9 and the ends of ducts 10 being on concentric circles of different diameters relative to the center of drum 1.

Movable part 7 of the valve is provided with orifices 11 for connecting it to ducts 9 and 10. The number of orifices 11 in each concentric row is equal to the number of cells 2.

Ducts 9 and 10 serve not only for connecting cells 2 to movable part 7 of the valve, but also for accumulating the filtrate in an amount necessary both for regeneration of the filtering material and for ensuring a hydraulic seal for the compressed air fed into cell 2 in the process of regeneration. If the deeply submerged drum vacuum filter shown in FIG. 3 is used for filtration, the cells may have accumulating pockets 12 in which the required amount of suspension is retained in cell 2 when it emerges from the suspension.

Fixed part 6 (FIG. 1) of the valve is provided with chamber 13 connected to a vacuum line for filtration proper, chamber 14 connected to a compressed air line for regeneration purposes, chamber 15 communicating with the atmosphere through control valve 16, and overflow channel 17. Channel 17 is so designed that one end thereof is disposed opposite a row of orifices 11 arranged on one of the concentric circles of movable part 7 of the valve, and the other end is opposite a row of orifices 11 arranged on another concentric circle of movable part 7, thereby connecting ducts 10 of each cell 2 emerging from the suspension to ducts 9 of each cell 2 submerging into the suspension.

Chambers 13, 14 and 15 of fixed part 6 of the valve are separated from one another by partitions which have such a shape that they can close duct 10 of each cell 2 when it emerges from the suspension to ensure more complete filling of the space of cell 2 and ducts 9 and 10 with the filtrate, and also duct 9 (FIG. 3) of the cell submerging into the suspension upon regeneration of the filtering material. This latter condition is not obligatory for filters with a small angle of submergence of drum 1 into the suspension (FIG. 1), when compressed air can be supplied into ducts 9 and 10.

The alternatives of arrangement of the chambers described above are not the only ones. The chambers of fixed part 6 of the valve, ducts 9 and 10 and channel 17 can be disposed in any other way ensuring rapid overflowing of the filtrate from cell 2 emerging from the suspension into cell 2 submerging into the suspension.

The drawings and the specification also do not describe other possible chambers in fixed part 6 of the valve, for example, chambers for removal of the washing liquid, for drying the precipitate and blowing air over it during its removal, since they are of no importance for the present invention.

The drum vacuum filter operates as follows.

Drum 1 (FIG. 1) of the filter rotates about its horizontal axis in the direction shown by arrow A. Movable part 7 of the valve, which is secured on the end of drum 1, turns with respect to fixed part 6 of the valve and consecutively connects each cell 2 of drum 1 to all the chambers of fixed part 6 of the valve.

As a result each cell 2 consecutively passes through: filtration zone $\omega$ (FIGS. 1 and 2), the zone of feeding the filtrate through overflow channel 17 from cell 2 emerging from the suspension into cell 2 submerging into the suspension; other zones not indicated in the description, including the zone where the precipitate is removed from the drum; the zone of filling cell 2 with filtrate through overflow channel 17; and the zone of regeneration of the filtering material.

Figure 4:
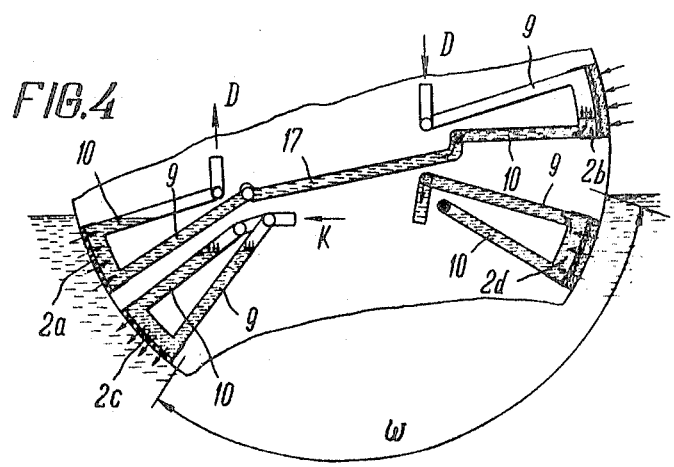
FIG. 4 is a diagram showing the operation of the drum vacuum filter of FIG. 1.

FIG. 4 shows the positions of cell 2 of the vacuum filter depicted in FIG. 1 when it passes through the zones listed above. The suspension from cell 2b flows through overflow channel 17 into cell 2a. In cell 2c the filtering material is regenerated by the counter current of the liquid, while in cell 2d the cell is filled with filtrate during the filtering process. FIGS. 5 and 6 show the same positions of cell 2 for the deeply submerged vacuum filter depicted in FIG. 3.

In the zone of filtration proper (on the angle $\omega$) cell 2 is connected by ducts 9 and 10 to vacuum chamber 13 (FIG. 3). The filtrate sucked into cell 2 is removed from the vacuum filter through ducts 9, 10 and chamber 13 in the direction shown by arrow B. Before the cell leaves the suspension (cell 2d, FIGS. 4 and 6), duct 9 is closed by the partition between the chambers, and the filtrate from cell 2 is removed only via duct 9. This ensures complete filling of the space of cell 2a (FIGS. 4 and 5), of accumulating pocket 12 (FIG. 5) and of ducts 9 and 10 (FIGS. 4 and 5) with the filtrate. As soon as the cell emerges from the suspension (cell 2b), duct 9 communicates through chamber 15 (FIGS. 1 and 3) and valve 16 with the atmosphere, and duct 10 with overflow channel 17 which, in turn, through cell 2 submerged in the suspension is connected to the vacuum. Owing to the pressure difference appearing in ducts 9 and 10, the filtrate is rapidly evacuated, and cell 2 is filled with air (the direction of air flow is shown by arrow D in FIGS. 1, 2, 4 and 5). The air in cell 2 upon passing through control valve 16 has a pressure somewhat below atmospheric, which ensures the retaining of the precipitates on the surface of drum 1.

After removal of the precipitate by means of device 5 (FIGS. 1 and 3), the cell submerges into the suspension (cell 2a, FIGS. 4 and 5). At this moment duct 10 communicates with vacuum chamber 13 (FIGS. 1 and 3) through which the air is removed from cell 2. A rarefaction is created in cell 2, and duct 9 of this cell is connected to overflow channel 17 which, in turn, is connected to cell 2 emerging from the suspension (cell 2b, FIGS. 4 and 5) and filled with filtrate. Cell 2a is rapidly filled with the filtrate, after which the cell is ready for regeneration of the filtering material. Next cell 2a passes to the position of cell 2c (FIGS. 4 and 6). Here cell 2 is connected either by both ducts 9 and 10 or only by duct 10 (FIG. 6) to compressed air chamber 14. The compressed air supplied from chamber 14 into ducts 9 and 10 (arrow K in FIGS. 1 and 4) or only into duct 10 (arrow K, FIGS. 2 and 6) presses the filtrate through the filtering material into trough 3 (FIGS. 1 and 3) of the filter. Thus regeneration of the filtering material is accomplished in a small zone and with an insignificant amount of filtrate.

After regeneration of the filtering material, filtration proper begins, and the cycle is repeated. Owing to the fact that the drum is divided into a plurality of cells 2 functioning according to the cycle described above, continuous operation of the filter is ensured.

Owing to the rapid filling of the cell submerging into the suspension with the filtrate required for liquid regeneration of the filtering surface, the vacuum filter provided by the invention has a considerably greater working zone of filtration and, accordingly, a higher output than the known vacuum filters with liquid regeneration. It can be successfully used in the chemical, food, medicine, ore-concentration and other branches of industry for the separation of suspensions into their solid and liquid phases, and especially for the filtration of slime and other products which greatly clog the filtering material.

What is claimed is:

1. A continuous drum vacuum filter comprising: a drum rotatable about its own axis; a trough for a suspension into which said drum is partly submerged; cells disposed on the working surface of said drum; filtering material forming the external sides of said cells; a valve installed coaxially with said drum; ducts so connecting said cells to the movable part of said valve that said cells during rotation of said drum are connected in the required sequence to suction and compressed air lines; an overflow channel made in the fixed part of said valve and providing for connection of said cell emerging from the suspension during rotation of said drum to said cell submerging into said suspension, thereby ensuring overflowing of the filtrate from the former cell to the latter one; a device for removing the precipitate from the external surface of said drum.

2. A drum vacuum filter according to claim 1, wherein said cells are provided with accumulating pockets.

* * * * *